United States Patent
Bullis et al.

(10) Patent No.: US 10,585,926 B2
(45) Date of Patent: Mar. 10, 2020

(54) MANAGING STRUCTURING OF LARGE SETS OF UNSTRUCTURED DATA

(71) Applicant: INTERNATIONAL BUSINESS MACHINES CORPORATION, Armonk, NY (US)

(72) Inventors: Paul K. Bullis, Cedar Park, TX (US); Geoffrey M. Hambrick, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 568 days.

(21) Appl. No.: 15/181,634

(22) Filed: Jun. 14, 2016

(65) Prior Publication Data
US 2017/0357730 A1 Dec. 14, 2017

(51) Int. Cl.
*G06F 16/00* (2019.01)
*G06F 16/338* (2019.01)
(Continued)

(52) U.S. Cl.
CPC ........ *G06F 16/338* (2019.01); *G06F 16/3323* (2019.01); *G06F 16/367* (2019.01)

(58) Field of Classification Search
CPC ......... G06F 17/30864; G06F 17/30654; G06F 17/30696; G06F 17/30011; G06F 17/2705; G06F 17/2785; G06F 17/30539; G06F 17/30672; G06F 17/30675; G06F 17/30699; G06F 17/30876; G06F 7/24; G06F 17/30684; G06F 17/30705; G06F 17/30731; G06F 17/30867; G06F 17/30516;
(Continued)

(56) References Cited

U.S. PATENT DOCUMENTS 7,668,849 B1 * 2/2010 Narancic ............. G06F 17/3089
707/811
8,683,322 B1 * 3/2014 Cooper ................. H04L 63/102
715/234

(Continued)

OTHER PUBLICATIONS

Wei Li, et al.,"Enhanced Information Retrival Using Domain-Specific Recommender Models", International Conference on the theorty of Information Retrieval, Oct. 7, 2011, p. 1-12.

*Primary Examiner* — Yicun Wu
(74) *Attorney, Agent, or Firm* — Cantor Colburn LLP; Alexander Jochym (57) ABSTRACT

Embodiments include method, systems and computer program products for managing structuring of large sets of unstructured data. In some embodiments, a search query may be received from a user via a graphical user interface (GUI). The search query may be parsed to identify a data aspect and a first value. An aspect-value pair may be generated using the data aspect and the first value. A data asset may be generated by associating a type structure to the unstructured data comprising a second value, wherein the type structure comprises the data aspect and the second value. A set of search results may be generated using the first value, wherein the set of search results comprises at least one data asset that matches the first value. Presentation of the set of search results may be facilitated, where the set of search results corresponds to the search query and comprises the data aspect.

15 Claims, 7 Drawing Sheets

(51) Int. Cl.
*G06F 16/332* (2019.01)
*G06F 16/36* (2019.01)

(58) Field of Classification Search
CPC .. G06F 17/30616; G06F 21/64; G06F 13/382; G06F 13/4068; G06F 17/2229; G06F 17/30091; G06F 17/30112
See application file for complete search history.

(56) References Cited

U.S. PATENT DOCUMENTS

| | | | |
|---|---|---|---|
| 8,775,356 B1 * | 7/2014 | Chen | G06F 17/30672 706/50 |
| 9,792,333 B2 * | 10/2017 | Reddy | G06F 17/30551 |
| 2007/0198498 A1 * | 8/2007 | Loftus | G06F 16/24534 |
| 2007/0239671 A1 | 10/2007 | Whitman et al. | |
| 2014/0222774 A1 | 8/2014 | Gras | |
| 2015/0142779 A1 | 5/2015 | Gupta et al. | |

* cited by examiner

MANAGING STRUCTURING OF LARGE SETS OF UNSTRUCTURED DATA

BACKGROUND

The present disclosure relates to data processing, and more specifically, to methods, systems and computer program products for managing structuring of large sets of unstructured data.

Searching for data and acting on the results of a search query is a common activity associated with many different types of computer applications. When a search query is submitted by the user, the user is effectively classifying the items being searched according to features and values that are important to them (and possibly to similar users). The act of searching may effectively provide a structure to otherwise unstructured data. However, such structure is transient and lost when the search session is over and information in the query string about their approach to classification may be lost. Generally, each search session starts from the same blank beginning point.

SUMMARY

In accordance with an embodiment, a computer-implemented method for managing structuring of large sets of unstructured data is provided. The method may include receiving a search query from a user via a graphical user interface (GUI); parsing the search query to identify a data aspect and a first value; generating an aspect-value pair using the data aspect and the first value; generating a data asset by associating a type structure to the unstructured data comprising a second value, wherein the type structure comprises the data aspect and the second value; generating a set of search results using the first value, wherein the set of search results comprises at least one data asset that matches the first value; and facilitating presentation of the set of search results, wherein the set of search results corresponds to the search query and comprises the data aspect.

In another embodiment, a computer program product may include a non-transitory storage medium readable by a processing circuit and stores instructions for execution by the processing circuit for performing a method comprising receiving a search query from a user via a graphical user interface (GUI); parsing the search query to identify a data aspect and a first value; generating an aspect-value pair using the data aspect and the first value; generating a data asset by associating a type structure to the unstructured data comprising a second value, wherein the type structure comprises the data aspect and the second value; generating a set of search results using the first value, wherein the set of search results comprises at least one data asset that matches the first value; and facilitating presentation of the set of search results, wherein the set of search results corresponds to the search query and comprises the data aspect.

In another embodiment, a system may include a processor in communication with one or more types of memory, the processor configured to receive a search query from a user via a graphical user interface (GUI); parse the search query to identify a data aspect and a first value; generate an aspect-value pair using the data aspect and the first value; generate a data asset by associating a type structure to the unstructured data comprising a second value, wherein the type structure comprises the data aspect and the second value; generate a set of search results using the first value, wherein the set of search results comprises at least one data asset that matches the first value; and facilitate presentation of the set of search results, wherein the set of search results corresponds to the search query and comprises the data aspect.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for managing structuring of large sets of unstructured data. The methods and systems described herein are directed to developing a taxonomy of object structures from various operands associated with search queries, such as those that use new search terms or existing search terms organized in unique ways. Information may be used independent of searches to classify and organize objects in a meaningful way.

Many search engines allow users to enter both simple and advanced searched that may include Boolean operations, such as "equals" (comparators), "not" (negation), "or" (union), and "and" (intersection). In some embodiments, such searches may provide search results ordered using a popularity index. Data obtained from such search results are not organized in accordance to the user's world view and any structure that may be implied or inferred cannot be made available to other users.

Some search engines permit users to save searches so that they can repeat them at a later time and may permit the saved searches to be shared with others. However, saved search phrases do not organize the data so that subsequent searching is more efficient because complex search expressions are still used. Some search engines permit users to create categories and filters within categories so that searching is more efficient because the categories and filters can be used to construct complex queries, but they do not have a mechanism to extract the categories and filters from the search feature. Some search engines permit keyword metadata to be associated with items in a search set so that subsequent searches using the keywords are simpler and more likely to return these items, but such a feature does not generally permit a general type structure that can be applied to multiple items based on the act of searching itself. In one embodiment, a search engine can be integrated with an item maintenance facility, which permits a type structure, such as a schema or template, to be created and used to guide gathering the data about items to be added. The search engine can further allow the same type structure to be used to edit the data about the items in the system.

In some embodiments, the system described herein may automatically extract domain specific type information about the items being searched from the search terms supplied by users to enable navigation and selection during subsequent searches. The system may build up a knowledgebase about the items being searched, whereas existing systems require owners of the data to decide what categories a user can navigate and what features a user can select for filters. The systems and methods described herein may allow the system to structure unstructured data in various ways based on terms meaningful to one or more users and domains not limited to those few structures provided by the owners. It also allows users to "restructure" the information in a manner that is meaningful to them and immediately use that information in subsequent searches.

In some embodiments, the system and methods described herein may derive and/or extract structured object model of a universe of items being searched based on naming each of the clauses of a parsed search query with respect to its purpose in that object model. Accordingly, values may be obtained from the search query even if the search is unsuccessful because information regarding what users are searching for is obtained. In some embodiments, the object structure or ontology may be built as users perform searches. Thus, every search helps to improve the ontology and therefore improve the efficiency of generating the search strings to be used in subsequent searches, for example by guiding, creating and/or editing items in the future to ensure they include the proper data/meta-data. The systems and methods described herein are directed to learning an object structure based on search phrases and using them more efficiently to construct future search phrases. In some embodiments, rather than being stored as "search phrases", compound clauses may be stored, which may be assembled to generate a complete search phrase.

Figure 1:
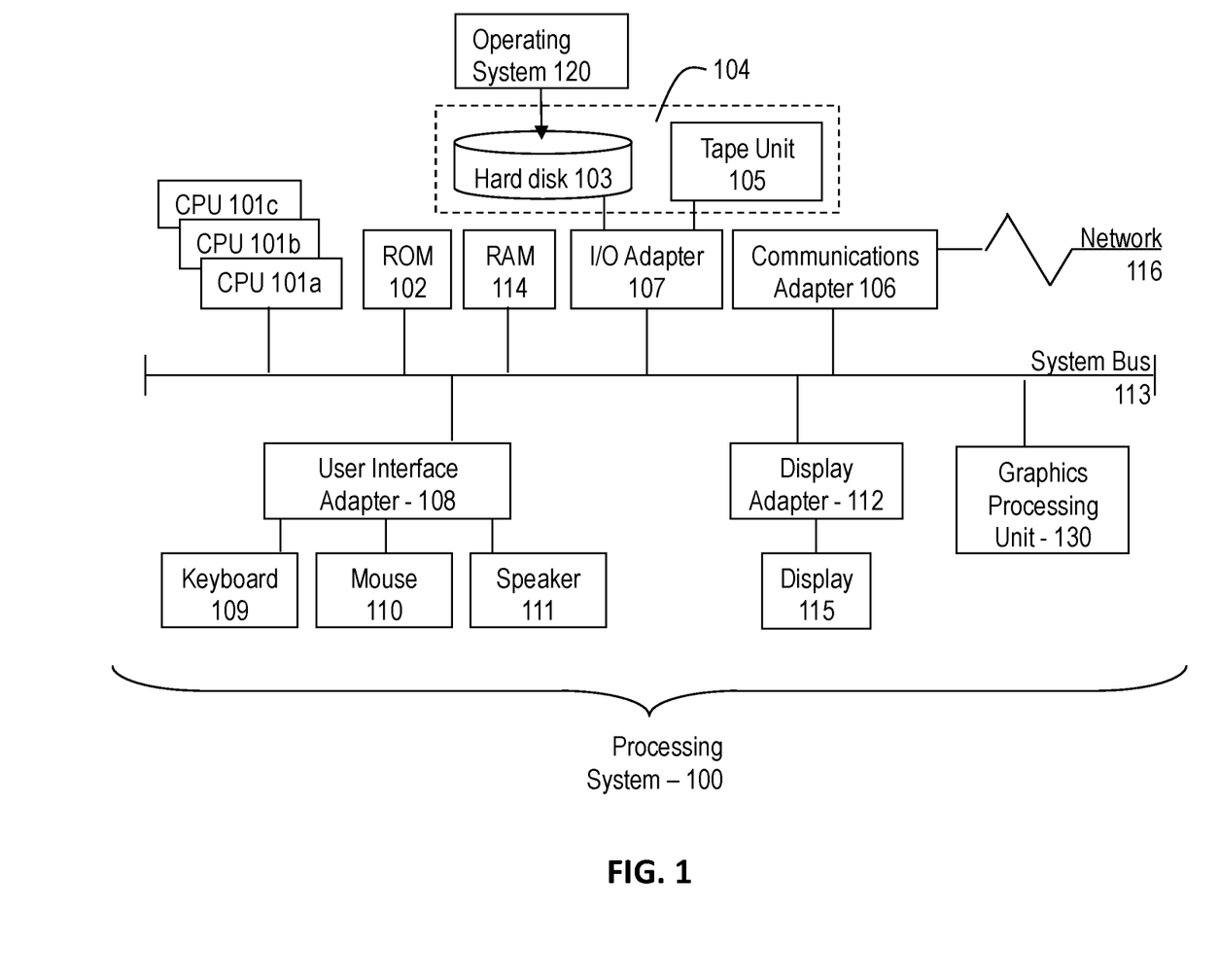
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 10a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
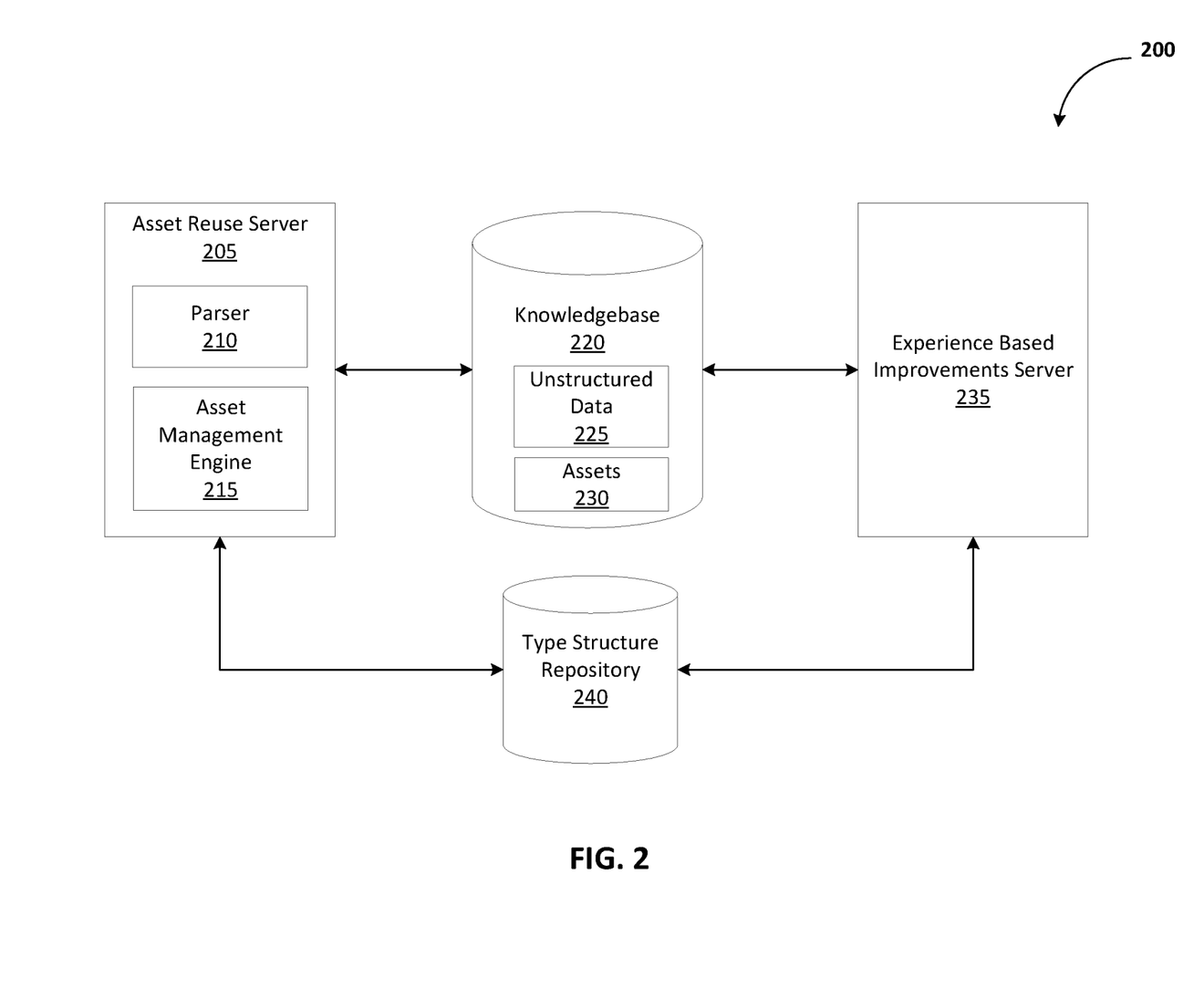
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to an asset reuse (AR) server 205, a knowledgebase datastore 220, an experience based improvements (EBI) server 235, and/or a type structure repository 240. The knowledgebase datastore 220 may store unstructured data 225 as well as assets 230. The type structure repository 240 may store aspect-value pairs and other type structure information associated with assets that may be stored in the knowledgebase 220 or otherwise applied to a universe of data available to the AR server 205. The aspect-value pairs can be categorized and nested, for example, where a date value is a structure of aspects and values including month, day and year. The system 200 may provide continuous improvements to assets 230 through navigation and reuse of information by classifying or applying different aspects to data, identifying a set of search results using more efficient searching through navigation and reuse of data assets 230, and evaluating selected assets and recommending improvements.

In some embodiments, the AR server 205 may be any type of user device, which may include laptops, desktop, servers, and the like. The AR server 205 may include a parser 210 and an asset management engine 215.

The parser 210 may include computer-readable instructions that in response to execution by the processor(s) 101 cause operations to be performed including receiving a search query from a user. The search query may be generated using a graphical user interface generated and presented to a user via a user device. The user device may be any type of device capable of processing data and connecting to a network. Examples of user devices may include smartphones, laptops, tablets, wearable computing devices, and the like. The parser 210 may receive a search query from one more user devices and may parse the search query into query expression clauses.

The asset management engine 215 may include computer-readable instructions that in response to execution by the processor(s) 101 cause operations to be performed including receiving a parsed search query from the parser 210. The asset management engine 215 may receive generate aspect-value pairings of asset type structures using the parsed search query. The asset management engine 215 may generate a data asset 230 by applying one or more aspect-value pairings and/or other type structure information to unstructured data. The asset management engine 215 may then transmit the generated data asset 230 to the knowledgebase datastore 220 for storage (e.g., future use by user or other users). In some embodiments, the asset management engine 215 may generate a set of search results using the aspect-value pairings, data assets 230, and other information. The asset management engine 215 may contribute to the development of the knowledgebase datastore 220 and generation of data assets 230 by processing the parsed search query and applying structure to unstructured data and/or applying additional type structure information or modifying type structure information associated with generated data assets 230.

The asset management engine 215 may communicate with a knowledgebase datastore 220 to retrieve and store data. The asset management engine 215 may also communicate with a type structure repository 240 to store and/or retrieve aspect-value pairings and other type structure data that may be associated with data assets 230. For example, the asset management engine 215 may apply the search query to unstructured data 225 and/or assets 230 to obtain a set of search results. In some embodiments, the asset management engine 215 may retrieve unstructured data 225 and generate assets 230 using one or more aspect-value pairings generated by the asset management engine 215 and/or retrieved from the type structure repository 240.

The assets 230, which may also be referred to as data assets, may be any type of data with an applied type structure. Examples of types of assets 230 may include, but are not limited to, tools, best practices, methods, examples, actors, and problems. Tools may be a type of asset 230 that are automated and have well defined steps in a process that is otherwise tedious and error prone to do manually. Best practices may be a type of asset 230 that includes documentation that describes when alternative approaches to solve a problem best apply. Methods may be a type of asset 230 that include an end-to-end process with milestones, deliverables, roles, and responsibilities that can be managed. Examples may be a type of asset 230 that include proven deployments of solutions and lessons learned, which may include sample artifacts as starting points. Actors may be a type of asset 230 that include individuals or teams of experts on a given task or technology that can help develop and/or deploy a solution. Problems may be a type of asset 230 that includes a clear description of goals and constraints, including how to measure that a task is complete.

In some embodiments, the asset management engine 215 may associate a name with each clause of the query expression, which may be persisted in a type structure repository 240 and associated with the search context. The asset management engine 215 may associate each Boolean operator use in a given query expression clause with a different aspect of a type structure that describes the items in the search. For example, a constant (e.g., string of characters or numbers) may represent a specific value of interest to the user. Naming a constant may allow many different domain specific values to be associated with the same canonical form and thus get a list of acceptable synonyms they could use in future queries. For example, by naming "International Business Machines" as "IBM", the search may allow either term to be used interchangeably for the value, as well as enable other synonyms such as "Big Blue" to be added later.

A comparator (e.g., contains, starts with, ends with, equal to, greater than or less than a specified value) may represent a specific feature of interest. Naming a comparator-clause may allow the users to decide which attributes (aspects) of the items they care about and allows other values of interest as to be associated with this attribute. Thus users can either select values from a list or add new ones in subsequent queries. For example, associating "Company" with the "contains" expression allows other values such as "Microsoft" to be added over time as possible choices for the comparator.

AND (e.g. intersection) may represent a type, where the operands represent the properties of the type. Naming an and-clause may allow the users to decide which types they care about searching and allow other attributes specified to be associated with the type. Thus, the user can get a list of attributes from which they might select in future queries. For example, associating "Product" with the selection of "Company:Company A", "Product Name:XYZ" and "Version: 8.5.5" starts creating a Product record structure consisting of the attributes Company, Product and Version to which other interesting attributes like "Supported Operating Systems" could be added in the future.

OR (e.g., union) may represent a category (or subset), where the operands represent the members of the subset. Naming an or-clause may allow the users to create taxonomies that divide large sets of values into manageable sets that can be navigated in future queries. For example, associating "Smarter Process Suite" with the union of "Product Name:BPM" and "Product Name:ODM" may allow these values to be specified together through a simple selection of the named union rather than having to find and select each value individually. Since the Comparators are referenced rather than contained in the named union, a given named comparator can appear in multiple categories.

NOT (e.g., negation) may represent those objects not matching the associated expression. For example, sometimes a user knows what they do not want rather than what they want as a filter. Giving that clause a name establishes an antonym in the type structure that can be very useful in subsequent searches. As another example, some users may be interested in exploring previously unexplored items in the set, and may name the not-clause associated with a previously defined query as "Other." As the original query gets modified to include more and more items, the "Other" set will shrink.

In some embodiments, the asset management engine 215 may facilitate the presentation of the result of the search query submitted but also the type structure that results from the query where elements are selected so that the query can be easily modified. The methods and systems described herein may be recursively applied to every element in the type structure, such as nested type structures, and taxonomies and ontologies may emerge from users searching the data that will enable even the most complex searches to be specified through navigation and selection.

In some embodiments, the system may include a combination of a natural language search facility with the navigation provided by the type structure, typically used when the number of values in a given aspect is large. In other embodiments, a currently selected taxonomy may be used as a context to simplify the text based query since it need not repeat the clauses associated with the selected aspects and values. The text may be parsed and appended to the associated query and thus extend the taxonomy.

In some embodiments, the system may include an EBI server 235. The EBI server 235 may communicate with the knowledgebase datastore 220. The EBI server 235 may analyze data assets in the context of user engagements and may develop actionable recommendations based on user experience information associated with the data assets 230 and obtained by the system 200. The EBI server 235 may obtain aspect-value pairings and other type structure information from the type structure repository 240 to use in evaluating data assets 230 that may be obtained from the knowledgebase datastore. By providing continuous evaluation of data assets 230 and actionable recommendations, the EBI server 235 enables the knowledgebase datastore 220 to maintain a dynamically evolving and updated ecosystem of data assets 230 available to all users of the system 200. In these embodiments, the type structure may be considered an asset as well, and thus improved based on continuous evaluation of the aspects, values and categories associated with the structure.

Figure 3:
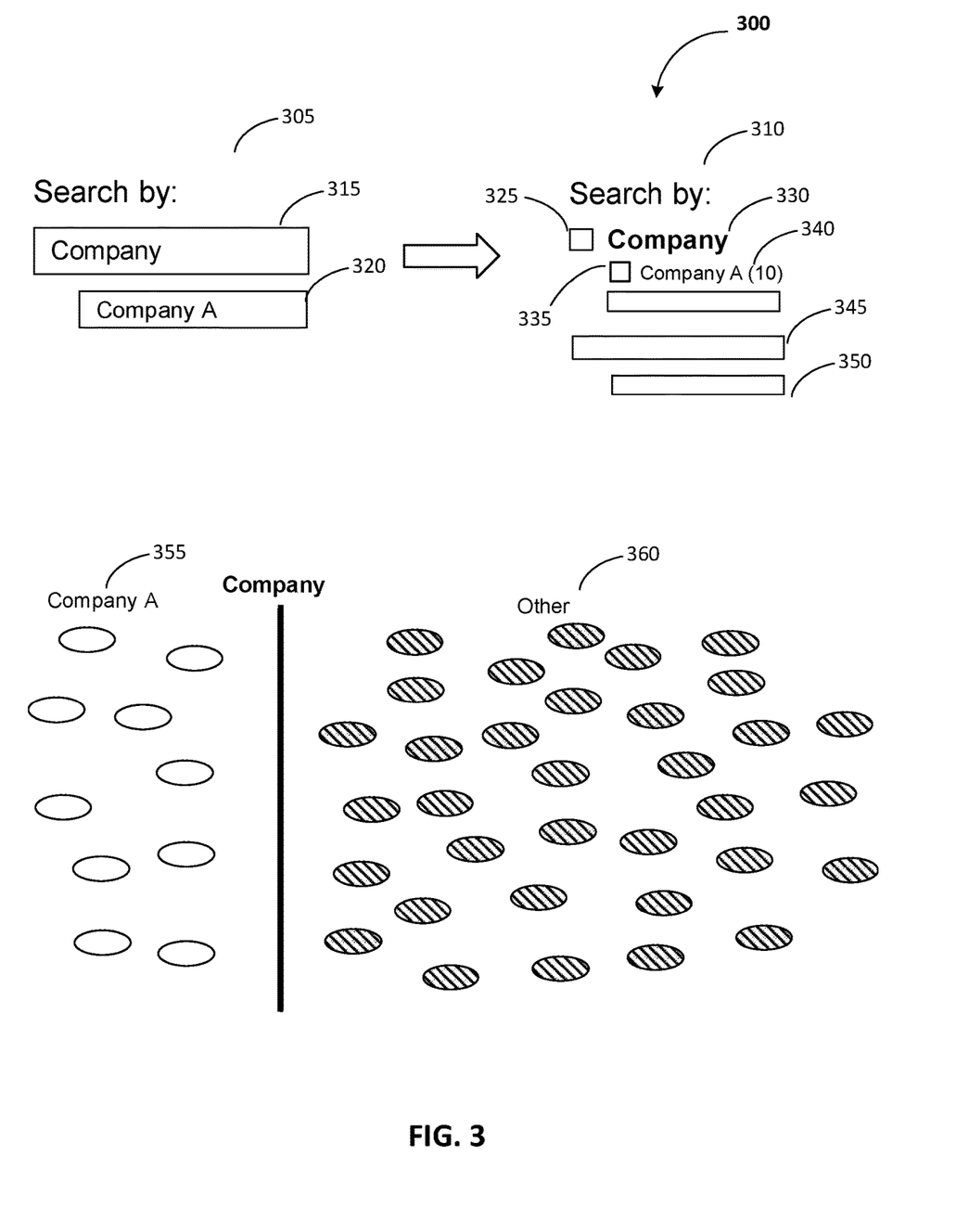
FIGS. 3, 4 and 5 are block diagrams illustrating managing structuring of large sets of unstructured data in accordance with an exemplary embodiment.
Figure 4:
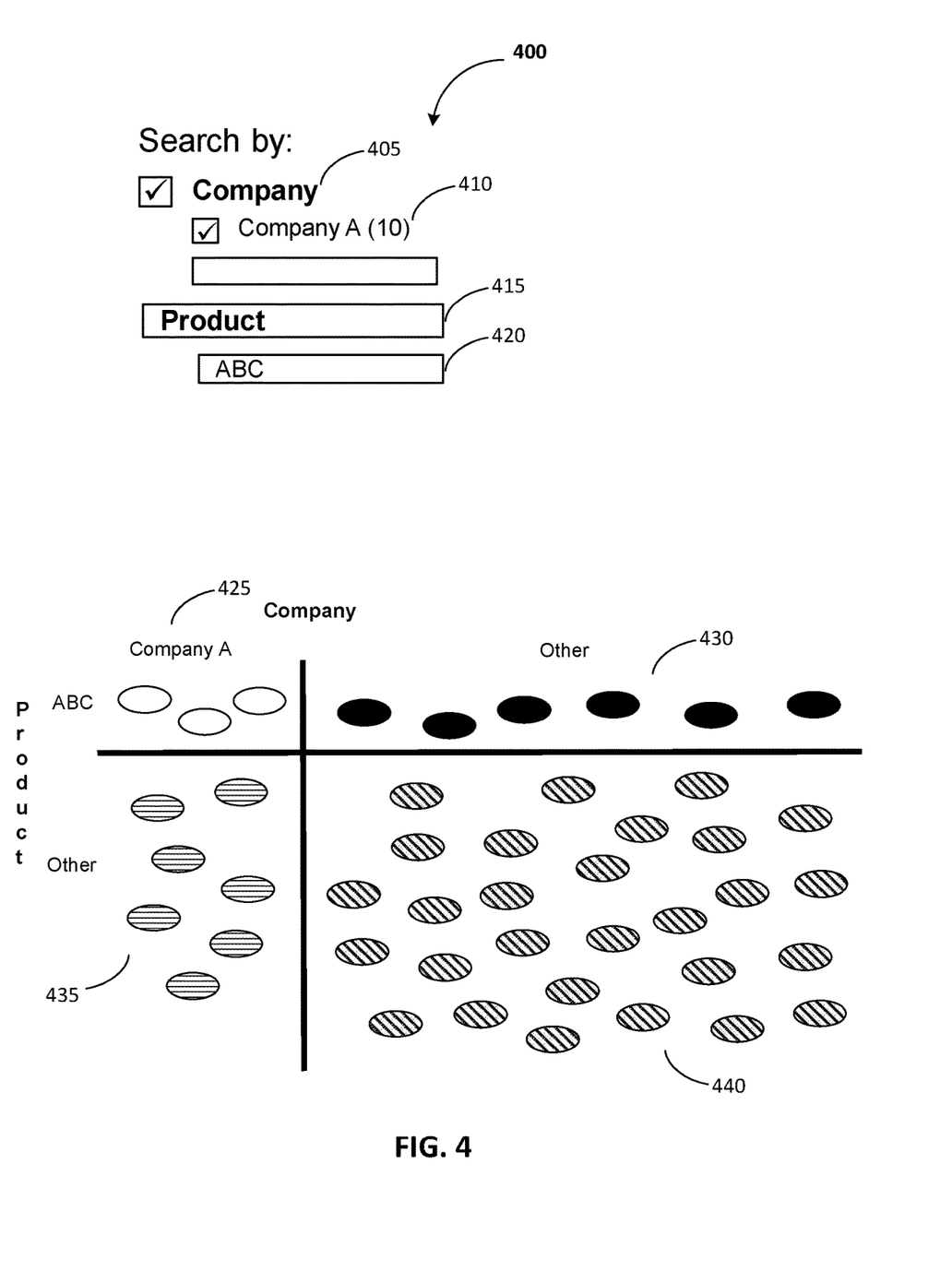
Figure 5:
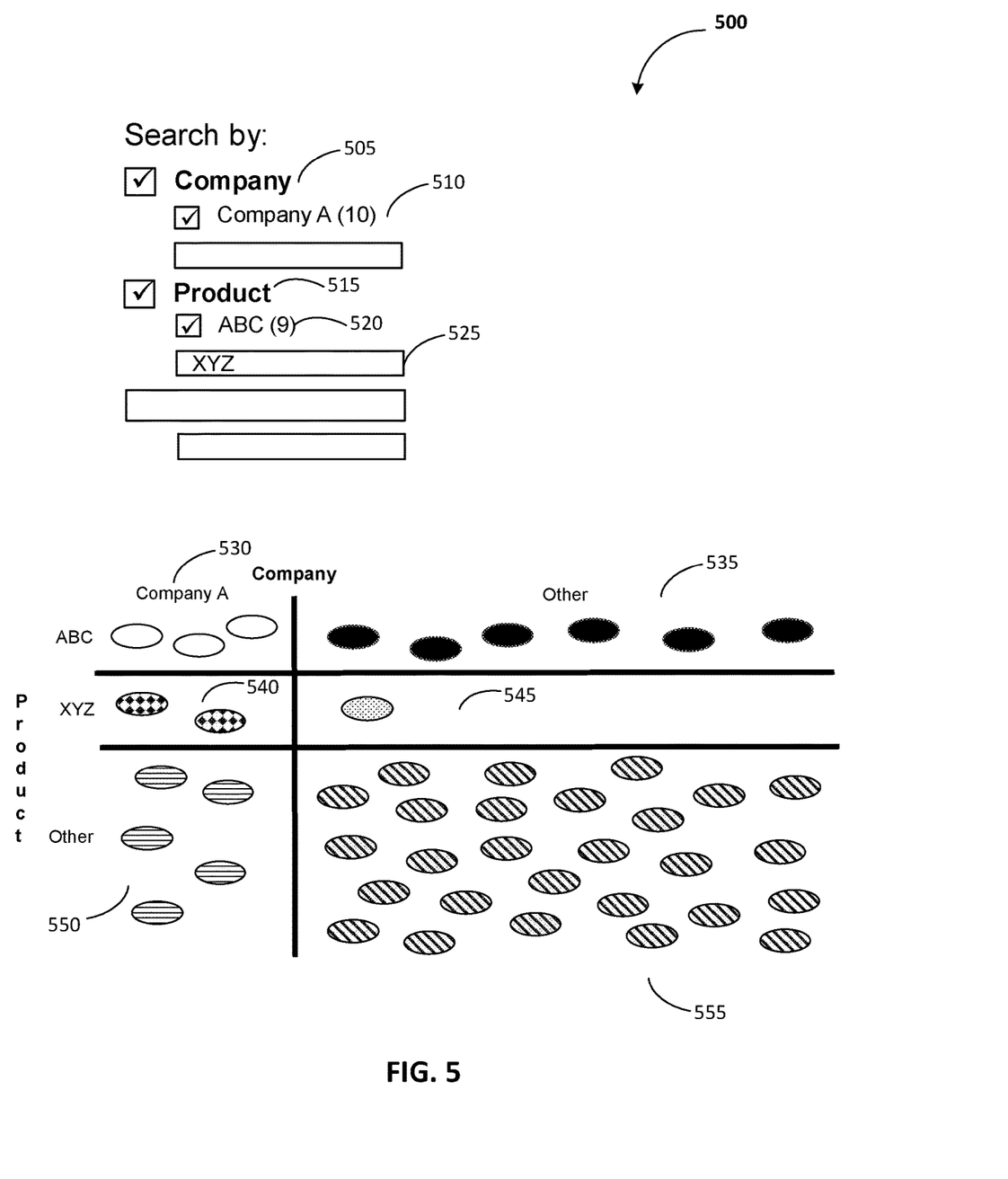

FIGS. 3-5 are block diagrams illustrating methods 300-500 of managing structuring of large sets of unstructured data in accordance with an exemplary embodiment. The systems and methods described here in assume that if a user provides information to generate a search query, that the information is useful for future queries and that each query can add more structure to the universe of data and increase the efficiency of the process.

FIG. 3 depicts a graphical user interface (GUI) 305 that currently does not have any data aspect or values displayed. Instead, the GUI 305 depicts text fields for a user to provide or specify information. For example, in text field 315, the user provided a data aspect "Company." Thus, the user is able to specify a specific data aspect that represents the type of value the user would like to search. Additionally, in the text field 320, the user provided a data value "Company A", which is the value that the user would like to search for. A search query may be generated using the information provided GUI 305, for example "contains Company A". Upon completion of the initial search, a result set may be presented to the user. Additionally, an updated GUI 310 may be presented the user or another user for subsequent searching. The updated GUI 310 may incorporate data aspect-value pairings that were provided in the previous interaction of GUI 305. For example, the updated GUI 310 may depict "Company" 330 as a data aspect and "Company A" 340 as a data value. The user may select the data aspect "Company" 330 by selecting the checkbox 325. Additionally, the user may select the data value "Company A" to be used in the search query by selecting checkbox 335. The user may specify an additional data aspect to search for using text field 345 and/or may specify an additional data value to search for using text field 350.

The data asset group 355 represents a group of data assets 230 that contain data value "Company A" 340 for the "Company" data aspect 330. The data asset group 360 represents a group of data assets 230 that do not contain data value "Company A" 340 for the "Company" data aspect 330.

FIG. 4 depicts a GUI 400 that displays a data aspect "Company" 405 and data value "Company A" 410. Additionally, the GUI 400 depicts a user specifying an independent data aspect to consider, namely "Product" 415. Additionally, the user also specifies an independent data value, namely "ABC" 420 that is the value of the data aspect "Product" 415 that the users wishes to use for searching.

Subsequent searches can immediately use type structure to make specifying queries easier and more meaningful. For example, the user added a new attribute of interest "Product" with a value of interest "ABC" that was stored prior to executing the extended query. In this embodiment, the default operation associated with two comparators at the same level is "and", and so returned the intersection of the two result sets, which the user hoped will have the effect of filtering the result set to a more manageable number:

This corresponds to the universe of data assets being further organized into different data asset groups. The data asset group 425 represents a group of data assets 230 that contain data value "Company A" 410 for the "Company" data aspect 405 and data value "ABC" 420 for the "Product" 415 data aspect. The data asset group 430 represents a group of data assets 230 that do not contain data value "Company A" 410 for the "Company" data aspect 405 but does contain the data value "ABC" 420 for the "Product" data aspect 415. The data asset group 435 represents a group of data assets 230 that do contain data value "Company A" 410 for the "Company" data aspect 405 but does not contain the data value "ABC" 420 for the "Product" data aspect 415. The data asset group 440 represents a group of data assets 230 that do not contain data value "Company A" 410 for the "Company" data aspect 405 and also do not contain the data value "ABC" 420 for the "Product" data aspect 415.

FIG. 5 represents a depiction of a GUI 500 and visual representation of data assets. The GUI 500 depicts that a user selected the checkbox associated with the "Company" data aspect 505 and the "Product" data aspect 515, which may indicate an AND operand. Additionally, the user selected the "Company A" data value 510 associated with the "Company" data aspect 505. Further, the user selected the "ABC" data value 520 and provided "XYZ" data value 525. The addition of a new data value may default to an "OR" operation, thus enabling the creation of a compound search query based on information provided by the user via the GUI 500.

The data asset group 530 represents a group of data assets 230 that contain data value "Company A" for the "Company" data aspect 505 and data value "ABC" for the data aspect "Product" 515. The data asset group 535 represents a group of data assets 230 that do not contain data value "Company A" for the "Company" data aspect 505 but contains the data value "ABC" for the data aspect "Product" 515.

The data asset group 540 represents a group of data assets 230 that contain data value "Company A" for the "Company" data aspect 505 and data value "XYZ" for the data aspect "Product" 515. The data asset group 545 represents a group of data assets 230 that do not contain data value "Company A" for the "Company" data aspect 505 but contain the data value "XYZ" for the data aspect "Product" 515.

The data asset group 550 represents a group of data assets 230 that contain data value "Company A" for the "Company" data aspect 505 and data value a data value that is not "ABC" or "XYZ" for the data aspect "Product" 515. The data asset group 555 represents a group of data assets 230 that do not contain data value "Company A" for the "Company" data aspect 505 and also do not contain the data values "ABC" or "XYZ" for the data aspect "Product" 515.

Figure 6:
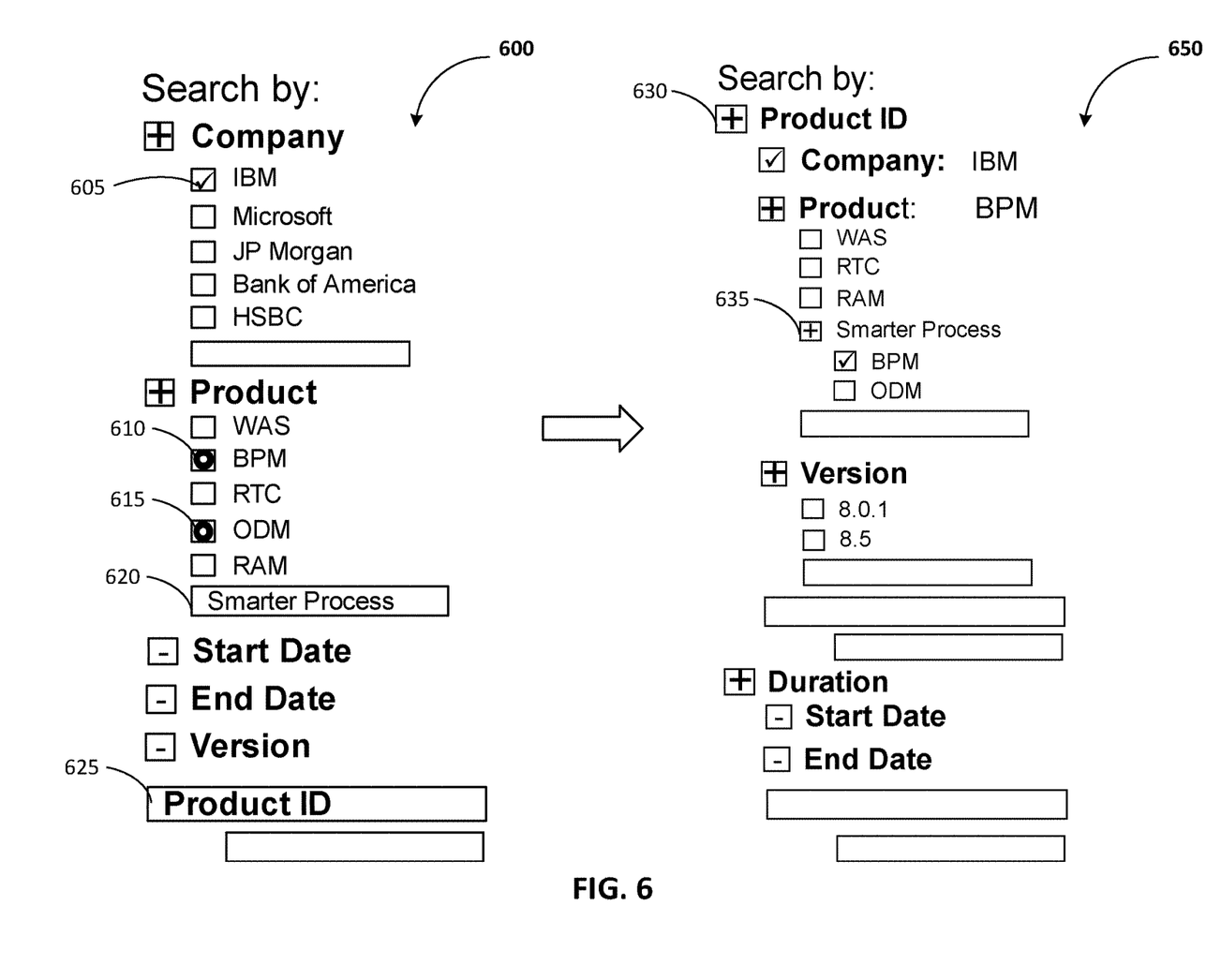
FIG. 6 is a block diagram illustrating restructuring of aspect-value pairs in accordance with an exemplary embodiment.

FIG. 6 is a block diagram illustrating GUIs 600, 650 for restructuring of aspect-value pairs in accordance with an exemplary embodiment. GUI 600 depicts multiple existing data aspects (e.g., Company, Product, Start Date, End Date, Version.) as well as a newly added data aspect 625 provided by a user in a text field of the GUI 600. Data aspects may list values from data assets 230 that have been identified as associated with the data aspects. For example, the "Company" data aspect lists multiple values that may be associated with the data aspect, namely "IBM", "Microsoft", "JP Morgan", "Bank of America", and "HSBC".

In some embodiments, different visual indicators may be used to indicate the type of Boolean operator to be used in generating a search query. For example, the checkmark 605 next to the IBM value may indicate to use an "AND" boolean operator, whereas the circles 610, 615 indicated next to "BPM" and "ODM" respectively, may indicate to use the "OR" boolean operator.

In some embodiments, a user may add additional values to search for, such as in the text box 620 where "Smarter Process" may have been added by a user in GUI 600. In other embodiments, text box 620 may be used to name the two values being "or'ed" and thus create a new subcategory 635. In one embodiment, the user can create the subcategory by adding the additional names for an object through a pop up menu associated with the object.

In some embodiments, aspect-value pairs as well as any other type of type structure information generated, obtained, and/or managed by the asset management engine 215 may themselves be treated as objects, thus allowing restructuring of the information and creation of different or additional data aspects. Based on information obtained from different users and/or different search queries, the asset management engine 215 may generate an updated GUI 650 upon determining that the Product ID data aspect 630 was found to be a combination of data aspects Company, Product, and Version. Accordingly, the updated GUI 650 reflects the reorganization of data aspects under Product ID 630. Additionally, the asset management engine 215 may determine, based on previously conducted searches, that BPM and ODM are subcomponents of a larger product that is referred to as "Smarter Process" 635, reflected in the organization of the data aspects under the "Smarter Process" 635 GUI label. In one embodiment, a pop up menu could be invoked after selecting the Company and Product aspects to combine them into a single higher level structure named Product Id.

Figure 7:
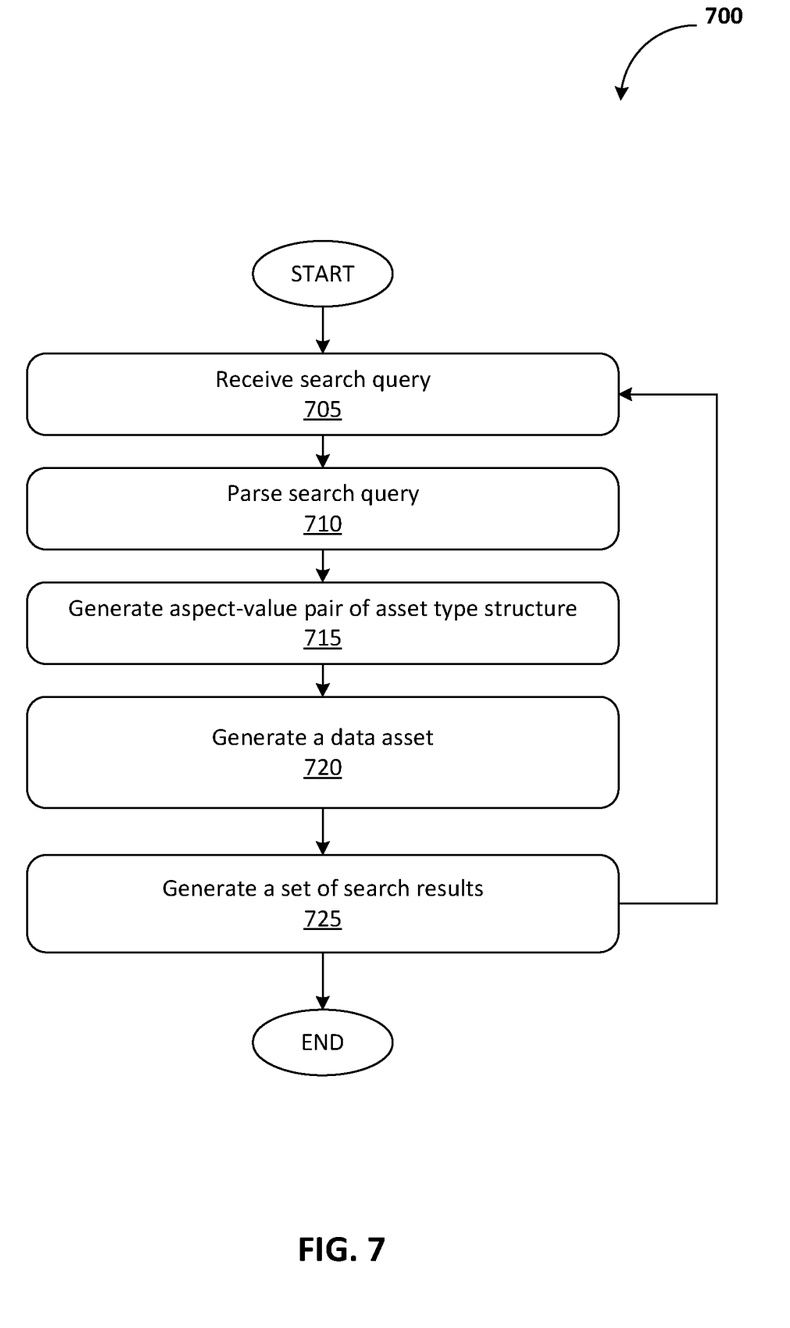
FIG. 7 is a flow diagram of a method for managing structuring of large sets of unstructured data in accordance with an exemplary embodiment.

Now referring to FIG. 7, a flow diagram of a method 700 for managing structuring of large sets of unstructured data in accordance with an exemplary embodiment is depicted. At block 705, a search query may be received. In some embodiments, a user device may generate or facilitate generation of a graphical user interface (GUI). The GUI may be presented to the user. The user may enter data into one or more fields of the GUI. The user device may then generate a search query based on information provided by the user. The search query may be generated and transmitted to the AR server 205. The search query may be transmitted to a parser 210 of the AR server 205. In some embodiments, one or more search queries may be received in a "batch" from a repository of searches that have been executed in the past or stored for retrieval and replay.

In some embodiments, the GUI may include different text fields, enabling a user to specify one or more aspects (e.g., categories, classifications, etc.) to associate with data and/or one or more values of aspects associated with the data to search for. In some embodiments, the GUI may have different visual indicators that represent different Boolean operands to be used when constructing a search query based on the information provided by the user. The GUI enables users of different searching skill and experience to obtain similar results by removing the skill required to create and submit complex search queries. Rather, the GUI provides users the ability to specify specific aspects and/or values to search for and to specify the type of Boolean operand to use. Information provided via the GUI may be used to generate a search query (e.g., by a client agent or other component executing on a device, such as a user device, utilized by the user) and transmit the search query to an AR server 205. Different visual indicators may be used to indicate different Boolean operators, such as AND, OR, NOT, XOR, etc. Examples of different visual indicators may be shapes, colors, text, size, icons, or the like.

At block 710, the search query may be parsed. In some embodiments, the parser 210 may receive a search query from a user device. In some embodiments, the search query may have been generated using information provided via a GUI. The parser 210 may parse the search query into query expression clauses. In some embodiments, the parser 210 may use any known techniques to parse the search query. In some embodiments, the parser 210 may parse the search query and identify one or more data aspects and/or one or more values of data aspects. The parser 210 may transmit the parsed query expression clauses, data aspects, and/or values to an asset management engine 215.

At block 715, an aspect-value pair of asset type structure may be generated. The asset management engine 215 may receive the data from the parser 210 and analyze the data. In some embodiments, the asset management engine 215 may determine that at least a portion of the received data is a data aspect and/or value of a data aspect. In some embodiments, the asset management engine 215 may analyze the data using one or more rules. In some embodiments, the asset management engine 215 may analyze the data using machine learning techniques. In some embodiments, the asset management engine 215 may determine that the received data is a data aspect and/or value of a data aspect based on metadata associated with the received data. The metadata may have been associated with the data when the search query was generated. In some embodiments, the metadata may have been associated with the data when the parser 210 parsed the search query. The asset management engine 215 may determine, based on the information received from the parser 210, that a data aspect and an identified value should be associated into an aspect-value pairing. In some embodiments, the asset management engine 215 may transmit the generated aspect-value pairing and/or any other type structure information generated or obtained by the asset management engine 215 to the type structure repository 240. In some embodiments, the aspect-value pairing may be stored in a data structure, such as a table, in the type structure repository 240. In some embodiments, the GUI may request that the user associate a name with the aspect or value when the aspect name cannot be parsed from search string.

At block 720, a data asset 230 may be generated. In some embodiments, the asset management engine 215 may generate a data asset 230 using the information obtained from the analyzed parsed search query. In some embodiments, the asset management engine 215 may generate a data asset 230 from unstructured data 225 by associating a type structure (e.g., data aspect) to the unstructured data 225 and linking a value of the unstructured data 225 to the data aspect obtained from the analyzed and parsed search query. A data aspect may be a category or classification associated with a data asset 230. In some embodiments, a data asset 230 may be associated with multiple data aspects, which may each be associated with one or more values. Data assets 230 may be categorized into types, as discussed in relation to FIG. 2, such as a problem, an actor, an example, a method, a best practice, or a tool.

At block 725 a set of search results may be generated. In some embodiments, the asset management engine 215 may generate a set of search results using a value obtained from the analyzed and parsed search query, by comparing the value from the search query to values of the data aspects of the data assets 230. In some embodiments, the asset management engine 215 may facilitate presentation of the set of results, if there are any, to the user. The set of search results may correspond to the search query and comprise data assets that have matching values for the identified data aspects.

In some embodiments, the method 700 is recursive, such that the method 700 may proceed back to block 705, where the asset management engine 215 may communicate with the user device operated by the user to generate an updated GUI using, for example the aspect-value pair from block 715 and facilitating presentation of the update GUI to the user. By incorporating the previously generated aspect-value pair in the updated GUI, the user is able to take advantage of previously generated information, whether the information was generated by the user or another user, thus increasing the efficiency of searching, rather than having to start over. The system 200 may now take advantage of previously generated knowledge by using known data aspects to more efficiently identify matching data assets, rather than having to search the entire universe of data.

A user may provide additional information via the updated GUI. The user device may generate a second search query using the information obtained from the updated GUI and may transmit the second search query to the AR server 205. The method 700 may proceed again through blocks 705-725. In some embodiments, the subsequent search queries may only specify a data aspect and/or a data value. Any information provided by the user via the search query may be parsed and analyzed and applied to data assets to build up the knowledgebase of data assets. Additionally, the parsed and analyzed data may be used to conduct a search on data to produce a set of search results.

Additionally, as discuss with regards to FIG. 6, aspect-value pairs as well as any other type of type structure information generated, obtained, and/or managed by the asset management engine 215 may themselves be treated as objects, thus allowing restructuring of the information and creation of different or additional data aspects. In some embodiments, the data aspects generated with regards to aspect-value pairs may be based on information obtained from search queries from many different users or multiple search queries requested by a user.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving a search query from a user via a graphical user interface (GUI), wherein the GUI comprises one or more of: a first visual indicator corresponding to an AND boolean operator, a second visual indicator corresponding to an OR boolean operator, a third visual indicator corresponding to a NOT boolean operator and a fourth visual indicator corresponding to a constant or a comparator, and wherein the search query includes one or more of: the first visual indicator, the second visual indicator, the third visual indicator and the fourth visual indicator;
    parsing the search query to identify a data aspect and a first value;
    generating an aspect-value pair using the data aspect and the first value;
    generating a data asset by associating a type structure to unstructured data comprising a second value, wherein the type structure comprises the data aspect and the second value;
    generating a set of search results using the first value, wherein the set of search results comprises at least one data asset that matches the first value;
    facilitating presentation of the set of search results, wherein the set of search results corresponds to the search query and comprises the data aspect; and
    restructuring a plurality of aspect-value pairs based on information obtained from a plurality of search queries from a plurality of users to generate different or additional data aspects.

2. The computer-implemented method of claim 1, further comprising:
    generating an updated GUI using the aspect-value pair;
    facilitating presentation of the updated GUI to the user;
    receiving a second search query via the updated GUI;
    parsing the second search query to identify a second data aspect and a third value;
    generating a second aspect-value pair using the second data aspect and the third value;
    updating the data asset by updating the type structure to comprise the second data aspect and a fourth value;
    generating a second set of search results using the third value, wherein the second set of search results comprises at least one data asset that matches the third value; and
    facilitating presentation of the second set of search results, wherein the set of search results corresponds to the second search query and comprises the data aspect and the second data aspect.

3. The computer-implemented method of claim 1, wherein the data asset is at least one of a problem, an actor, an example, a method, a best practice, or a tool.

4. The computer-implemented method of claim 1, further comprising:
    storing the aspect-value pair to a data structure comprising a plurality of aspect-value pairs.

5. The computer-implemented method of claim 1, further comprising:
    generating an updated GUI using the aspect-value pair; and
    facilitating presentation of the updated GUI to a second user.

6. A computer program product comprising a non-transitory storage medium readable by a processing circuit and storing instructions for execution by the processing circuit for performing a method comprising:
    receiving a search query from a user via a graphical user interface (GUI)), wherein the GUI comprises one or more of: a first visual indicator corresponding to an AND boolean operator, a second visual indicator corresponding to an OR boolean operator, a third visual indicator corresponding to a NOT boolean operator and a fourth visual indicator corresponding to a constant or a comparator, and wherein the search query includes one or more of: the first visual indicator, the second visual indicator, the third visual indicator and the fourth visual indicator;
    parsing the search query to identify a data aspect and a first value;
    generating an aspect-value pair using the data aspect and the first value;
    generating a data asset by associating a type structure to unstructured data comprising a second value, wherein the type structure comprises the data aspect and the second value;
    generating a set of search results using the first value, wherein the set of search results comprises at least one data asset that matches the first value;
    facilitating presentation of the set of search results, wherein the set of search results corresponds to the search query and comprises the data aspect; and restructuring a plurality of aspect-value pairs based on information obtained from a plurality of search queries from a plurality of users to generate different or additional data aspects.

7. The computer program product of claim 6, wherein the method further comprises:
generating an updated GUI using the aspect-value pair;
facilitating presentation of the updated GUI to the user;
receiving a second search query via the updated GUI;
parsing the second search query to identify a second data aspect and a third value;
generating a second aspect-value pair using the second data aspect and the third value;
updating the data asset by updating the type structure to comprise the second data aspect and a fourth value;
generating a second set of search results using the third value, wherein the second set of search results comprises at least one data asset that matches the third value; and
facilitating presentation of the second set of search results, wherein the set of search results corresponds to the second search query and comprises the data aspect and the second data aspect.

8. The computer program product of claim 6, wherein the data asset is at least one of a problem, an actor, an example, a method, a best practice, or a tool.

9. The computer program product of claim 6, wherein the method further comprises:
storing the aspect-value pair to a data structure comprising a plurality of aspect-value pairs.

10. The computer program product of claim 6, wherein the method further comprises:
generating an updated GUI using the aspect-value pair; and
facilitating presentation of the updated GUI to a second user.

11. A system, comprising:
a processor in communication with one or more types of memory, the processor configured to:
receive a search query from a user via a graphical user interface (GUI), wherein the GUI comprises one or more of: a first visual indicator corresponding to an AND boolean operator, a second visual indicator corresponding to an OR boolean operator, a third visual indicator corresponding to a NOT boolean operator and a fourth visual indicator corresponding to a constant or a comparator, and wherein the search query includes one or more of: the first visual indicator, the second visual indicator, the third visual indicator and the fourth visual indicator;
parse the search query to identify a data aspect and a first value;
generate an aspect-value pair using the data aspect and the first value;
generate a data asset by associating a type structure to unstructured data comprising a second value, wherein the type structure comprises the data aspect and the second value;
generate a set of search results using the first value, wherein the set of search results comprises at least one data asset that matches the first value;
facilitate presentation of the set of search results, wherein the set of search results corresponds to the search query and comprises the data aspect; and
restructure a plurality of aspect-value pairs based on information obtained from a plurality of search queries from a plurality of users to generate different or additional data aspects.

12. The system of claim 11, wherein the processor is further configured to:
generate an updated GUI using the aspect-value pair;
facilitate presentation of the updated GUI to the user;
receive a second search query via the updated GUI;
parse the second search query to identify a second data aspect and a third value;
generate a second aspect-value pair using the second data aspect and the third value;
update the data asset by updating the type structure to comprise the second data aspect and a fourth value;
generate a second set of search results using the third value, wherein the second set of search results comprises at least one data asset that matches the third value; and
facilitate presentation of the second set of search results, wherein the set of search results corresponds to the second search query and comprises the data aspect and the second data aspect.

13. The system of claim 11, wherein the data asset is at least one of a problem, an actor, an example, a method, a best practice, or a tool.

14. The system of claim 11, wherein the processor is further configured to:
store the aspect-value pair to a data structure comprising a plurality of aspect-value pairs.

15. The system of claim 11, wherein the processor is further configured to:
generate an updated GUI using the aspect-value pair; and
facilitate presentation of the updated GUI to a second user.

* * * * *